(12) United States Patent
Chen et al.

(10) Patent No.: US 8,233,516 B2
(45) Date of Patent: Jul. 31, 2012

(54) WIDEBAND CORRELATION MODE SWITCHING METHODS AND APPARATUSES

(75) Inventors: Shiou-Hung Chen, San Diego, CA (US); Rayman Wai Pon, Cupertino, CA (US); Emilija M. Simic, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 12/491,145

(22) Filed: Jun. 24, 2009

(65) Prior Publication Data

US 2010/0329312 A1    Dec. 30, 2010

(51) Int. Cl.
 *H04B 1/00* (2006.01)
(52) U.S. Cl. ........ 375/142; 375/152; 375/343; 455/506; 455/67.11; 455/226.2; 370/465; 370/479
(58) Field of Classification Search .................. 375/142, 375/143, 150, 152, 147, 140, 141, 340, 343; 455/506, 65, 67.11, 226.2, 226.3; 370/320, 370/321, 335, 441, 464, 465, 479
See application file for complete search history.

(56) References Cited

U.S. PATENT DOCUMENTS

| | | | |
|---|---|---|---|
| 5,901,183 A | 5/1999 | Garin et al. | |
| 5,966,403 A | 10/1999 | Pon | |
| 6,748,009 B2 * | 6/2004 | Reznik et al. | 375/147 |
| 7,002,516 B2 | 2/2006 | Gronemeyer | |
| 7,738,606 B2 * | 6/2010 | Williamson et al. | 375/347 |
| 8,000,378 B2 * | 8/2011 | Mo et al. | 375/148 |
| 2010/0135365 A1 | 6/2010 | Chen et al. | |

FOREIGN PATENT DOCUMENTS

| | | |
|---|---|---|
| EP | 0779518 | 6/1997 |
| EP | 1962101 | 8/2008 |

OTHER PUBLICATIONS

Abbasfar A, et al., "Design and VLSI Implementation for a WCDMA Multipath Searcher" IEEE Transactions on Vehicular Technology, IEEE Service Center, Piscataway, NJ, US LNKD- DOI:10.1109/TVT.2005.844664, vol. 54, No. 3, May 1, 2005, pp. 889-902, XP011132644 ISSN: 0018-9545 col. 2-col. 19; figures 2,8,9.

Dierendonck Van A J, et al., "Evaluation of GNSS Receiver Correlation Processing Techniques for Multipath and Noise Mitigation" Proceedings of the Ion National Technical Meeting, The Institute of Navigation, US, Jan. 14, 1997, pp. 207-215, XP000852621 the whole document.

International Search Report and Written Opinion—PCT/US2010/039819, International Search Authority—European Patent Office—Nov. 5, 2010.

* cited by examiner

*Primary Examiner* — Dac Ha

(74) *Attorney, Agent, or Firm* — Shyam K. Parekh; Howard H. Seo

(57) ABSTRACT

Methods and apparatus are provided for use in devices operatively enabled to perform waveform correlation result processing.

36 Claims, 5 Drawing Sheets

WIDEBAND CORRELATION MODE SWITCHING METHODS AND APPARATUSES

BACKGROUND

1. Field

The subject matter disclosed herein relates to electronic devices, and more particularly to methods and apparatuses for use in electronic devices operatively enabled to perform waveform correlation result processing.

2. Information

Wireless communication systems and devices are fast becoming one of the most prevalent technologies in the digital information arena. Satellite and cellular telephone services and other like wireless communication networks may already span the entire globe. Additionally, new wireless systems (e.g., networks) of various types and sizes are added each day to provide connectivity between a plethora of devices, both fixed and portable. Many of these wireless systems are coupled together through other communication systems and resources to promote even more communication and sharing of information. Indeed, it is not uncommon for some devices to be operatively enabled to communicate with more than one wireless communication system and this trend appears to be growing.

Another popular and increasingly important wireless technology includes navigation systems and devices and in particular satellite positioning systems (SPS) such as, for example, the global positioning system (GPS) and other like Global Navigation Satellite Systems (GNSS). An SPS receiver, for example, may receive wireless SPS signals that are transmitted by a plurality of orbiting satellites of a GNSS. The SPS signals once received may be processed, for example, to determine a global time, an approximate geographical location, altitude, and/or speed associated with a device having the SPS receiver path.

These exemplary wireless devices and/or other similar electronic devices may be operatively enabled to perform waveform correlation and/or other like processes that allow for a specific wireless signal to be identified within a reference waveform which may include noise and other signals. In certain situations, a specific wireless signal may arrive at a receiving wireless device via different paths. For example, a reference waveform may include a wireless signal that traveled directly from an antenna of a transmitting device to an antenna of the receiving device along a direct path, and one or more multipath versions of the wireless signal which may have traveled along different reflected paths. It may be beneficial to adapt a wireless device to remove, ignore, reduce, or otherwise discriminate in some manner such multipath signals and/or identify a signal without or with less significant multipath components/effects.

SUMMARY

Methods and apparatuses are provided for use in devices operatively enabled to perform waveform correlation result processing by selectively initiating and/or otherwise using different correlation modes.

In accordance with one exemplary aspect, a method may be provided that includes accessing at least a portion of data associated with an acquired wireless signal, and selectively determining code phase measurement data associated with the data. Here, for example, the wireless signal may include a first signal path component and a second signal path component. Selectively determining code phase measurement data associated with the data may include selectively initiating at least one of a plurality of selectable correlation modes based, at least in part, on a measured signal strength associated with the data, and distinguishing the first signal path component from at least a portion of the second signal path component as represented within the data based, at least in part, on a non-uniform autocorrelation function associated the one of the plurality of selectable correlation modes.

In accordance with one exemplary aspect, an apparatus may be provided that includes memory operatively enabled to store at least a portion of data associated with an acquired wireless signal, and wherein the wireless signal comprises a first signal path component and a second signal path component. The apparatus also includes at least one processing unit coupled to the memory and operatively enabled to access at least the portion of data, selectively initiate at least one of a plurality of selectable correlation modes based, at least in part, on a measured signal strength associated with the data, distinguish the first signal path component from at least a portion of the second signal path component as represented within the data based, at least in part, on a non-uniform autocorrelation function associated the one of the plurality of selectable correlation modes; and establish code phase measurement data associated with the data.

In accordance with another exemplary aspect, an apparatus may be provided that includes means of providing at least a portion of data associated with an acquired wireless signal, wherein the wireless signal comprises a first signal path component and a second signal path component, means for selectively initiating at least one of a plurality of selectable correlation modes based, at least in part, on a measured signal strength associated with the data, and means for distinguishing the first signal path component from at least a portion of the second signal path component as represented within the data based, at least in part, on a non-uniform autocorrelation function associated the one of the plurality of selectable correlation modes, and means for establishing code phase measurement data associated with the data.

In accordance with yet another exemplary aspect, an article of manufacture may be provided that includes a computer readable medium having stored thereon. The computer implementable instructions which if implemented by one or more processing units may operatively enable the processing unit(s) to access at least a portion of data associated with an acquired wireless signal, wherein the wireless signal comprises a first signal path component and a second signal path component, selectively initiate at least one of a plurality of selectable correlation modes based, at least in part, on a measured signal strength associated with the data, distinguish the first signal path component from at least a portion of the second signal path component as represented within the data based, at least in part, on a non-uniform autocorrelation function associated the one of the plurality of selectable correlation modes, and establish code phase measurement data associated with the data.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Figure 1:
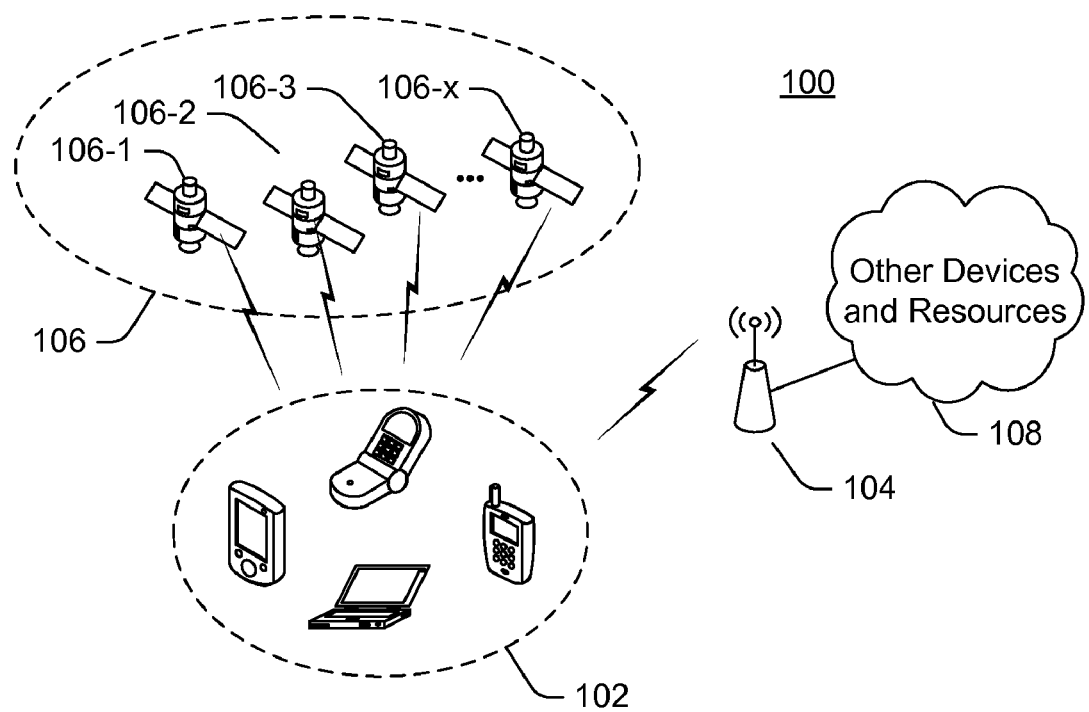
FIG. 1 is block diagram illustrating an exemplary wireless signaling environment that includes a device operatively enabled to perform waveform correlation processing in accordance with an implementation.

Methods and apparatus are provided for use in devices operatively enabled to perform waveform correlation result processing. Such methods and apparatuses may, for example, be implemented in wireless navigation and/or communication devices that are operatively enabled to receive wireless signals within a received reference waveform and to correlate the reference waveform with at least one locally generated waveform.

Wireless signals are often corrupted by multipath components, which may lead to significant code phase detection errors and/or other errors. In certain existing GPS devices, for example, multipath mitigation performance may be limited in narrowband correlation modes having limited (e.g., course) code phase hypothesis resolution and/or limited (e.g., low) sampling rates. For example, an autocorrelation function (ACF) waveform having an operative width of one chip may be unable to resolve multipath component(s) in the GPS signal that may be separated by less than 1.5 chips, due to c×2 hypothesis resolution, ACF width, local max criterion, etc. Such "short multipath" components/corruption may therefore not be distinguishable for example by a peak detection algorithm or the like, which may process signal related data associated with energy cells of a signal energy/search-grid.

As used herein with regard to correlation modes, the terms "narrowband" and "wideband" are intended to discriminate between different receiver bandwidth capabilities and/or the like that may provide different levels sampling rate. Therefore, a wideband correlation mode may provide for a higher level (increased) sampling rate and thus hypothesis resolution than might a narrowband correlation mode. By way of example but not limitation, in certain implementations an example narrowband correlation mode may be associated with a 1 MHz bandwidth with chip×1 (c×1) or chip×2 (c×2) sampling rate and an example wideband correlation mode may be associated with a 10 MHz or greater bandwidth with chip×20 (c×20) or greater sampling rate.

In the future higher sampling rates, such as, e.g., chip×20, may allow for an increase in signal-related data, such as, for example energy-grid data which may provide for an increase in hypothesis resolution within an energy grid. Furthermore, "non-uniform" correlation techniques may be implemented to provide for increased resolution and thus possible mitigation for short multipath components/corruption.

As presented herein by way of certain exemplary techniques, it may be useful to selectively operate with, and/or switch between, different correlation modes to provide for different levels of multipath resolution.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Methodologies described herein may be implemented by various means depending upon applications according to particular features and/or examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The exemplary methods and apparatuses may be operatively enabled to any electronic device. Examples of such devices herein include navigation and/or communication devices. However, claimed subject matter is not intended to be limited to just these examples.

With regard to certain exemplary navigation devices, a satellite positioning system (SPS) may include a system of transmitters positioned to enable entities to determine their location on the Earth based, at least in part, on signals received from the transmitters. Such a transmitter may transmit a signal marked with a repeating pseudo-random noise (PN) code of a set number of chips and may be located on ground based control stations, user equipment and/or space vehicles. A "space vehicle" (SV) as referred to herein relates to an object that is capable of transmitting signals to receivers on or above the Earth's surface. In one particular example, such an SV may include a geostationary satellite. Alternatively, an SV may include a satellite traveling in an orbit and moving relative to a stationary position on the Earth. However, these are merely examples of SVs and claimed subject matter is not limited in these respects.

In a particular example, such transmitters may be located on SVs such as Earth orbiting satellites. For example, a satellite in a constellation of a Global Navigation Satellite System (GNSS) such as Global Positioning System (GPS), Galileo, Glonass or Compass may transmit a signal marked with a PN code that is distinguishable from PN codes transmitted by other satellites in the constellation.

To estimate a location at a receiver, a navigation device may be operatively enabled to determine pseudorange measurements to SVs "in view" of the receiver using well known techniques based, at least in part, on detections of PN codes in signals received from the SVs. Such a pseudorange to an SV may be determined based, at least in part, on a code phase detected in a received signal marked with a PN code associated with the SV during a process of acquiring the received signal at a receiver. To acquire the received signal, a navigation device may be operatively enabled to correlate a reference waveform (e.g., received signal) with a generated waveform (e.g., locally generated PN code) associated with an SV. For example, such a navigation device may correlate such a received signal with multiple code and/or phase/time shifted versions (replica signals) of such a locally generated PN code. Detection of a particular time and/or code shifted version yielding a correlation result with the highest signal power may indicate a code phase associated with the acquired signal for use in measuring pseudorange as discussed above.

Upon detection of a code phase of a signal received from a GNSS SV, a receiver may form multiple pseudorange hypotheses, e.g., logically associated with a search grid or the like. Using additional information, a receiver may eliminate such pseudorange hypotheses to, in effect, reduce an ambiguity associated with a true pseudorange measurement. With sufficient accuracy in knowledge of timing of a signal received from a GNSS SV, some or all false pseudorange hypotheses may be eliminated.

Once a signal has been acquired, a receiving device may enter into a tracking or other like mode or operation to continue to identify and/or monitor a specific wireless signal within a received reference waveform. As presented in the example implementations herein, selective correlation mode processing techniques may be provided to refine or attempt to refine an acquired signal, for example, by identifying and removing, and/or otherwise distinguishing at least portions of the signals that may have been influenced in some manner by its transmission path (e.g., short multipath). For example, in navigation systems more accurate timing/location information may be established by distinguishing direct path signals from multipath signals.

While the examples herein include navigation signals it should be understood that the methods and apparatuses and techniques provided herein are adaptable to other wireless signaling systems, such as, for example, wireless communication systems. Again, claimed subject matter is not intended to be limited to navigation systems.

With this in mind, FIG. 1 is a block diagram illustrating a wireless environment 100 that may include various computing and communication resources. This example implementation may be operatively enabled to provide at least some form of navigation services in accordance with certain exemplary implementations of present description. This example implementation may also and/or alternatively be operatively enabled to provide at least some form of communication services in accordance with certain exemplary implementations of present description.

As for navigation services, for example, as shown in FIG. 1 an SPS 106 may include a plurality of SVs 106-1, 106-2, 106-3, . . . , 106-x that may transmit SPS signals to a device 102.

By way of example but not limitation, as illustrated using icons in FIG. 1, device 102 may include a mobile device such as a cellular phone, a smart phone, a personal digital assistant, a portable computing device, a navigation unit, and/or the like or any combination thereof. In other exemplary implementations, device 102 may take the form of a machine that is mobile or stationary. In still other exemplary implementations, device 102 may take the form of one or more integrated circuits, circuit boards, and/or the like that may be operatively adapted for use in another device.

In certain implementations wireless environment 100 may further include and/or alternatively include various computing and communication resources operatively enabled to provide communication and/or other information processing services with respect to device 102. Thus, for example, wireless environment 100 may be representative of any system(s) or a portion thereof that may include at least one device 102 operatively enabled to transmit and/or receive wireless signals to/from at least one wireless communication system 104.

As illustrated in FIG. 1, wireless communication system 104 may be operatively enabled to communicate with and/or otherwise operatively access other devices and/or resources as represented simply by cloud 108. For example, cloud 108 may include one or more communication devices, systems, networks, or services, and/or one or more computing devices, systems, networks, or services, and/or the like or any combination thereof.

Device 102 may, for example, be adapted for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example.

Device 102 may receive transmissions from SVs 106-1, 106-2, 106-3, . . . , 106-x in the line of sight (LOS) to device 102, and derive time measurements from four or more of the transmissions. At times, device 102 may receive transmissions from one or more of SVs 106-1, 106-2, 106-3, . . . , 106-x via a multipath route to device 102.

Techniques described herein may be used with any one of several SPS' and/or combinations of SPS'. Furthermore, such techniques may be used with positioning determination systems that utilize pseudolites or a combination of SVs and pseudolites. Pseudolites may include ground-based transmitters that broadcast a PN code or other ranging code (e.g., similar to a GPS or CDMA cellular signal) modulated on an L-band (or other frequency) carrier signal, which may be synchronized with system time. Such a transmitter may be assigned a unique PN code so as to permit identification by a remote receiver. Pseudolites may be useful in situations where GPS signals from an orbiting SV might be unavailable, such as in tunnels, mines, buildings, urban canyons or other enclosed areas. Another implementation of pseudolites is known as radio-beacons. The term "SV", as used herein, is intended to include pseudolites, equivalents of pseudolites, and possibly others. The terms "SPS signals" and/or "SV signals", as used herein, is intended to include SPS-like signals from pseudolites or equivalents of pseudolites.

With this in mind and in accordance with certain aspects, some exemplary methods and apparatuses will now be described, which may be implemented in one or more devices, such as device 102, to provide waveform correlation result processing.

Figure 2:
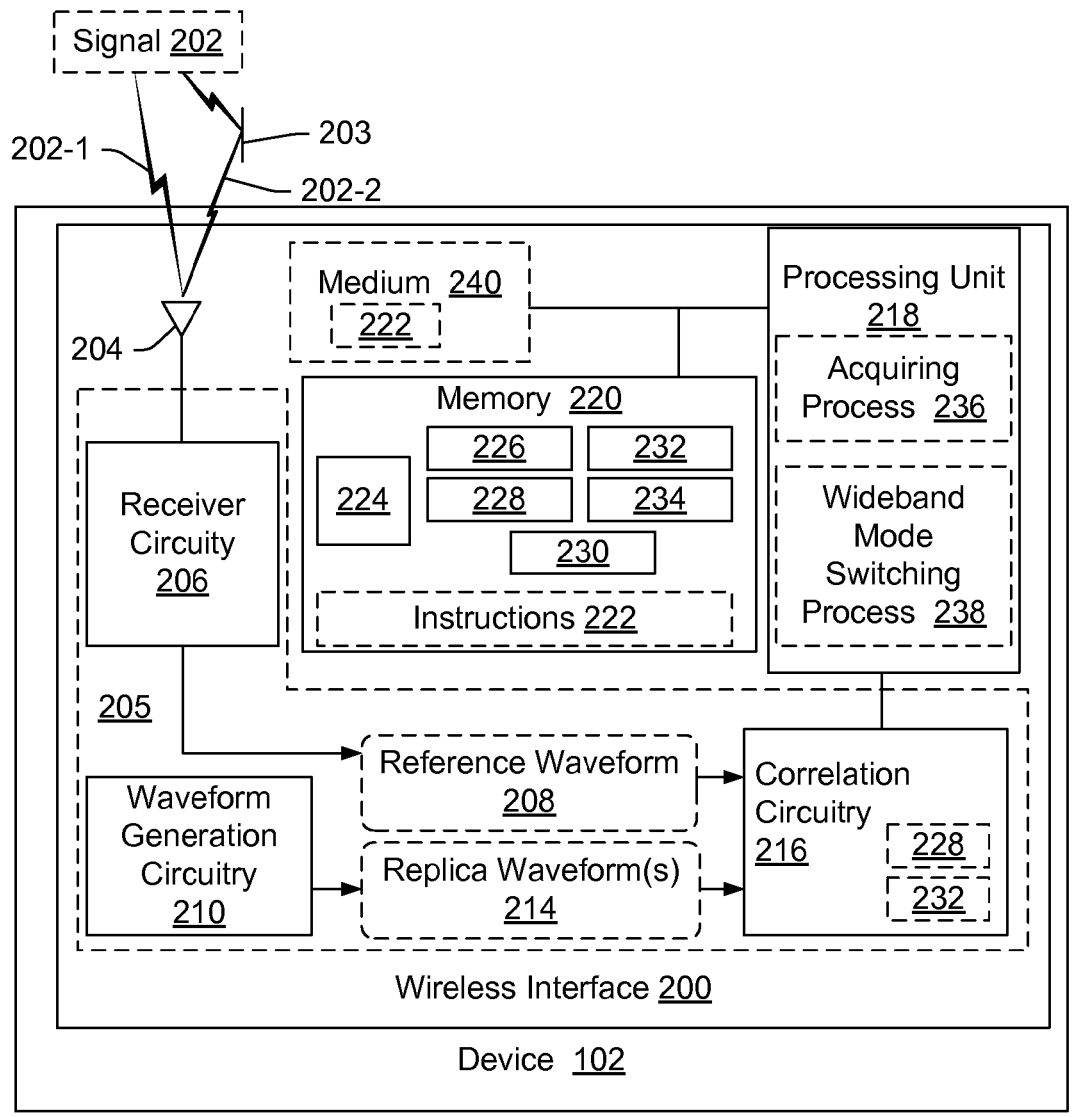
FIG. 2 is block diagram illustrating certain features of an exemplary device having at least one wireless interface operatively enabled to perform waveform correlation processing that may, for example, be implemented in the environment of FIG. 1.

As illustrated in the exemplary block diagram of FIG. 2, in certain example implementations, device 102 may include a wireless interface 200 operatively enabled to receive a wireless signal 202. Wireless interface 200 may, for example, be adapted for use with navigation signals, communication signals, and/or other like wireless signals. Here, wireless signal 202 may follow a direct path (e.g., LOS) as represented by wireless signal 202-1, and/or may follow one or more paths (e.g., multipath) as represented by wireless signal 202-2 which is illustrated as being at least partially reflected and/or otherwise affected during transmission by at least one interfering object/condition 203. Here, as a result of the different transmission paths, wireless signals 202-1 and 202-2 may be different in some manner upon receipt (e.g., time/phase shifted, attenuated, etc.).

As shown in the example implementation, wireless interface 200 may include at least one antenna 204 that may be operatively coupled to circuitry 205 which may be enabled to a least acquire wireless signal 202. As illustrated in this example, circuitry 205 may include receiver circuitry 206, which may be operatively enabled to receive wireless signal 202 and possibly other signals, noise, etc., and establish a corresponding reference waveform 208. Circuitry 205 may also include, for example, waveform generation circuitry 210 that may be operatively enabled to establish at least one local code waveform and/or a plurality of replica waveforms 214, which may be used for waveform correlation.

Circuitry 205 may include, for example, correlation circuitry 216 that may be operatively enabled to correlate at least reference waveform 208 with one or more of the plurality of waveforms 212/214 to establish a corresponding plurality of correlation results, for example, as code phase measurement data and/or part of an energy-grid and/or the like.

Various different types of correlation circuits are well known and which may be implemented within correlation circuitry 216. Correlation circuitry 216 may be implemented in hardware, software, or a combination of hardware and software. By way of example but not limitation, correlation circuitry 216 may, for example, include one or more correlators, implement a discrete Fourier transform (DFT) function, and/or the like. In certain implementations, correlation circuitry 216 may include one or more processing units and specific instructions, and/or the like.

Wireless interface 200 may include, for example, one or more processing units 218 operatively enabled to perform waveform correlation result processing in accordance with the present description. As shown, processing unit 218 may be operatively coupled to memory 220. Memory 220 may be operatively enabled to store data and/or instructions. For example, as shown in the example implementation of FIG. 2, instructions 222 and/or signal related data 224 may be stored in memory 220. As illustrated, memory 220 may also be used to store code phase measurement data 226. As illustrated, memory 220 may also be used to store data and/or instructions associated with one or more selectable correlation modes 228, measured signal strength 230, ideal autocorrelation function pulse shot of uniform and/or non-uniform 232, and/or one or more thresholds 234 (e.g., related to factors such as signal strength, time, age, etc.). In certain implementations, reference waveform 208, local code waveform and/or one or more replica waveforms 214 may be digitized and stored in memory 220 and accessed by correlation circuitry 216.

As illustrated in FIG. 2 an article of manufacture represented here by a computer readable medium 240 may be provided and accessed by processing unit 218, for example. As such, in certain example implementations, the methods and/or apparatuses may take the form in whole or part of a computer readable medium 240 that may include computer implementable instructions 222 stored thereon, which if executed by at least one processing unit or other like circuitry are operatively enabled to enable the processing unit(s) 218 and/or the other like circuitry to perform all or portions of the waveform correlation result processes presented herein.

Processing unit 218 may be implemented in hardware, software, or a combination of hardware and software. Processing unit 218 may be representative of one or more circuits configurable to perform at least a portion of a data computing procedure or process. By way of example but not limitation, processing unit 218 may include one or more processors, controllers, microprocessors, microcontrollers, application specific integrated circuits, digital signal processors, programmable logic devices, field programmable gate arrays, and the like, or any combination thereof.

As shown in FIG. 2, processing unit 218 may be operatively enabled to provide, in whole or part, one or more processes associated with the waveform correlation result processing provided herein. By way of example but not limitation, processing unit 218 may be operatively enabled to provide or otherwise support an acquiring process 236, and/or mode switching process 238. In certain example implementations, processing unit may establish at least a portion of one or more of data 224, code phase measurement data 226, data and/or instructions associated with one or more selectable correlation modes 228, measured signal strength 230, uniform and/or non-uniform autocorrelation functions 232, and/or one or more thresholds 234. In certain implementations, such instructions and/or data may be operatively implemented to enable correlation circuitry 216 in some manner. Thus, for example, such association/operation is represented in FIG. 2 by data and/or instructions associated with one or more selectable correlation modes 228, and/or uniform and/or non-uniform autocorrelation functions 232, which are also shown within correlation circuitry 216. These processes and corresponding data are described in greater detail in subsequent sections.

Memory 220 may be representative of any data storage mechanism. Memory 220 may include, for example, a primary memory and/or a secondary memory. Primary memory may include, for example, a random access memory, read only memory, etc. While illustrated in this example as being separate from processing unit 218, it should be understood that all or part of a primary memory may be provided within or otherwise co-located/coupled with processing unit 218. Secondary memory may include, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 240. Here, for example, computer readable medium 240 may include any media that can carry data and/or instructions.

Figure 3:
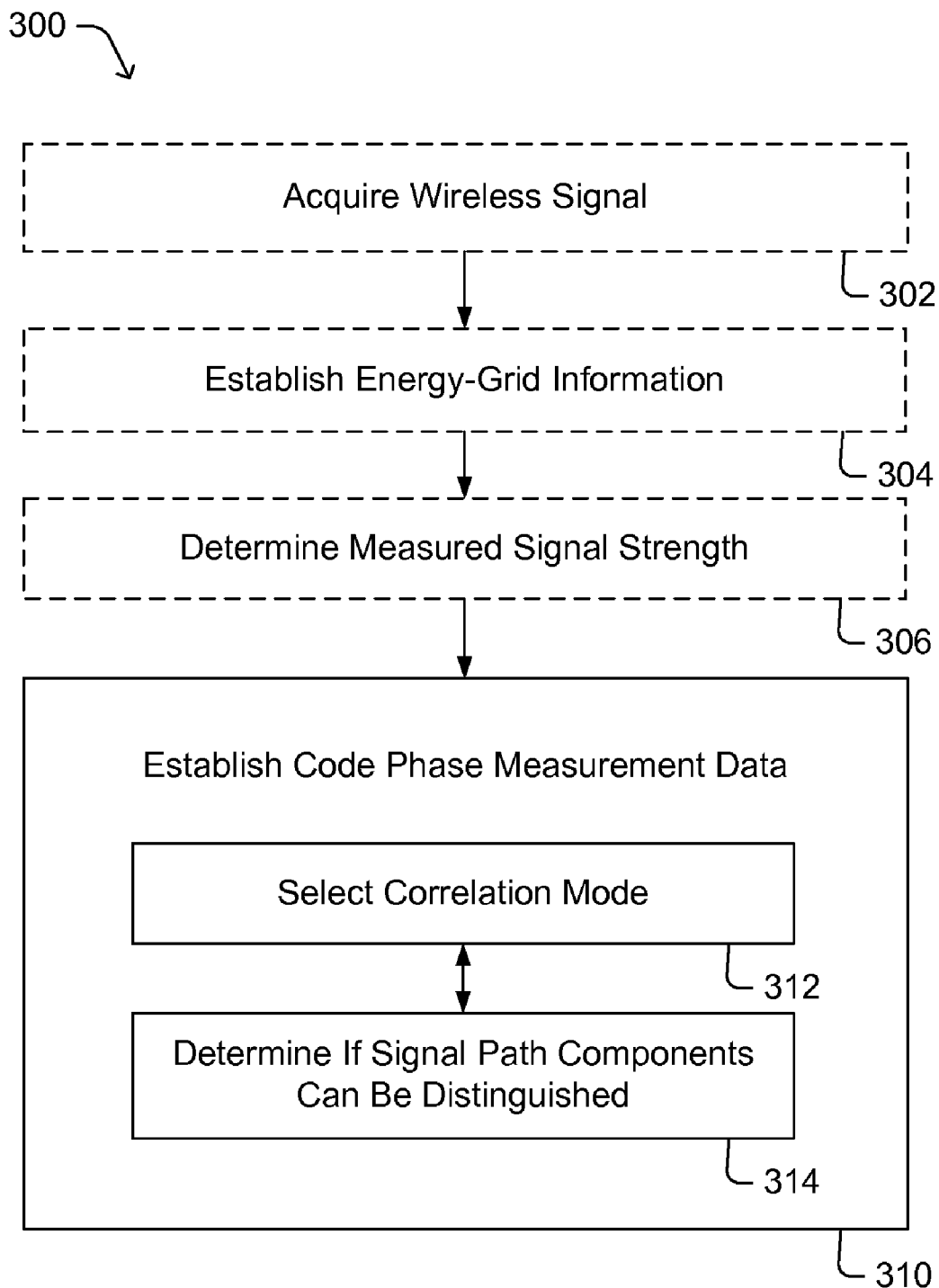
FIG. 3 is a flow diagram illustrating an exemplary method operatively enabled to perform waveform correlation processing that may, for example, be implemented in the environment of FIG. 1 and/or the device of FIG. 2.

Attention is drawn next to FIG. 3, which is a flow diagram illustrating an exemplary method 300 that may be operatively enabled to perform waveform correlation processing.

At block 302 at least one wireless signal 202 may be acquired. Wireless signal 202 may include components such as signals 202-1 and 202-2, for example, wherein signal 202-1 comprises a direct signal component and signal 202-2 comprises a multipath signal component. At block 304, at least a portion of signal related data 224 may be established. Signal related data 224 may be associated the acquired wireless signal, which may include for example, an SPS signal and/or the like. At block 306, measured signal strength 230 associated with the acquired wireless signal 202 may be determined.

In certain example implementations, one or more of blocks 302, 304 and/or 306 may be associated with acquiring process 236 (FIG. 2) and block 310 may be associated, at least in part, with mode switching process 238 (FIG. 2).

At block 310, code phase measurement data 226 associated with the signal related data may be established. For example, it may be determined if code phase measurement data 226 may be established by, at block 312, selecting at least one correlation mode and, at block 314 determining if certain signal path components may be distinguished in some manner.

In certain example implementations, at block 312, at least one of a plurality of selectable correlation modes 228 may be selected based, at least in part, on a measured signal strength 230 associated with data 224. By way of example but not limitation, a first one of the plurality of selectable correlation modes may be selectively initiated and/or otherwise performed if the measured signal strength 230 exceeds a first signal strength threshold. Similarly, for example, a second one of the plurality of selectable correlation modes may be initiated and/or otherwise performed if the measured signal strength 230 does not exceed the first signal strength threshold but does exceed a second signal strength threshold.

At block 314, for example, it may be determined if a first signal path component is distinguishable from at least a portion of a second signal path component as represented within data 224 based, at least in part, on a non-uniform autocorrelation function 232 associated the selected correlation mode. For example, it may be determined if a first signal path component is distinguishable from at least a portion of a second signal path component based on differences in correlation data, peak detection identification, and/or via other known signal processing techniques.

In certain example implementations, it may be determined if a first signal path component is distinguishable from at least a portion of a second signal path component using a path detector that may consider a raw energy peak is found at code hypothesis h and interpolated peak is d c×20 away from the raw peak. To take the advantage of all the sampling points on the pulse, one may define the Peak Shape Likelihood (PSL) function $$PSL = \left\{ \frac{\underline{u}\underline{S}'(d)}{sqrt(\underline{S}(d)\underline{S}'(d))} \right\}$$

where $$\underline{u} = [e(h-19)e(h-18) \ldots e(h+19)]/pk\_height$$

denotes to the normalized 39 raw energy cells around the raw energy peak e(h), and $$\underline{S}(d) = [s(-d-N)s(-d-(N-1)) \ldots s(-d-1)]$$

are c×20 samples on the ideal normalized pulse shape (s(0) refers to peak).

Such an exemplary likelihood function may be operatively enabled to estimate the similarity of the incoming pulse leading edge and ideal ACF. Signals corrupted by a multipath may end up with lower likelihood below $T_{PSL}$, indicating ACF shape is off from ideal due to a short multipath component. Here, for example, a threshold $T_{PSL}$ may be chosen such that $P_{FA\_fatpath} = 10^{-2}$ for single path close to sensitivity.

By way of example but not limitation, the first one of the selectable correlation modes may be associated with a first non-uniform autocorrelation function 606 (see FIG. 6) having a first operative width, and the second one of the selectable correlation modes may be associated with a second non-uniform autocorrelation function 604 (see FIG. 6) having a second operative width. Here, for example, the first operative width may be narrower than the second operative width.

At block 310, if it is determined that code phase measurement data may be established then such code phase measurement data may be established at block 310.

Conversely, if it is determined that code phase measurement data may not be established using the first one of the selectable correlation modes, then block 310 may be operatively enabled to determine if other code phase measurement data associated with signal related data may be established. Here, for example, at block 312, a second one of the selectable correlation modes may be initiated and/or otherwise performed, and at block 314 it may be determined if the first signal path component can be distinguished from at least a portion of the second signal path component as represented within the signal related data based, at least in part, on a second non-uniform autocorrelation function associated the second one of the selectable correlation modes. If it is determined that such other code phase measurement data may be established then such other code phase measurement data may be established at block 310.

In the example implementations herein, certain known techniques may be implemented to provide for the correlation of a local code waveform and replica waveforms thereof with a reference waveform. Further, it is known that there may be benefits to combining two or more shifted/amplified versions of the local code waveform (e.g., replica waveforms) together to form a combined waveform which may then be correlated with the reference waveform. One potential benefit to correlating a reference waveform with a combined waveform is that the shape of the combined waveform may be selected such that it excludes certain multipath components within the reference waveform.

In certain exemplary implementations, such a combined waveform (e.g., a non-uniform waveform) may be established prior to correlation. In certain other exemplary implementations, post correlation result processing techniques may be implemented to match, simulate, emulate or otherwise approximate in some manner the results of correlating the reference waveform with one or more combined waveforms (e.g., non-uniform waveforms). Thus, for example, the post correlation processing techniques may be operatively enabled to provide benefits previously realized by correlating the reference waveform with a combined waveform, but without necessarily requiring that such combined waveform be established prior to correlation. Thus, in certain implementations, such post correlation processing techniques may establish combined waveform like correlation results based on the correlation results associated with a plurality of waveforms such as the local code waveform and/or replica waveforms. In certain implementations, one or more combined waveform like correlation results (combined measurement values) may be established simultaneously, and/or the combining formula(s) easily changed without introducing significant delays.

As described in more detail below, in certain example implementations, in a (uniform) selectable correlation mode a reference waveform (e.g., an acquired wireless signal) may be correlated with a 1-chip wide reference code waveform 502 (see FIG. 5) which may result in a corresponding autocorrelation function (ACF) waveform 602 (see FIG. 6) that may have an operable width of 1 chip. Other (non-uniform) selectable correlation modes may be operatively enabled to correlate using a different reference waveform such as, for example, non-uniform waveforms 504 or 506. Thus, the output ACF waveforms 604 or 606 (see FIG. 6) may provide for operative widths that are narrower and thus signal path components such as short multipath components may be distinguished (e.g., become resolvable in some manner).

Figure 5:
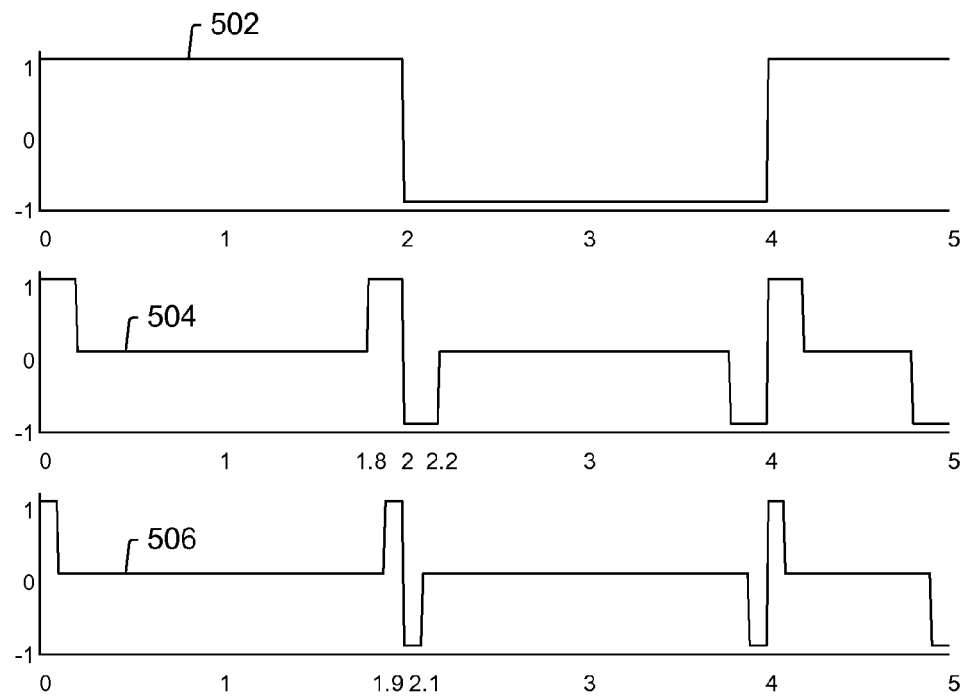
FIG. 5 is an illustrative set of graphed waveforms presenting certain aspects of some exemplary uniform and non-uniform waveforms that may be associated with certain correlation processes.
Figure 6:
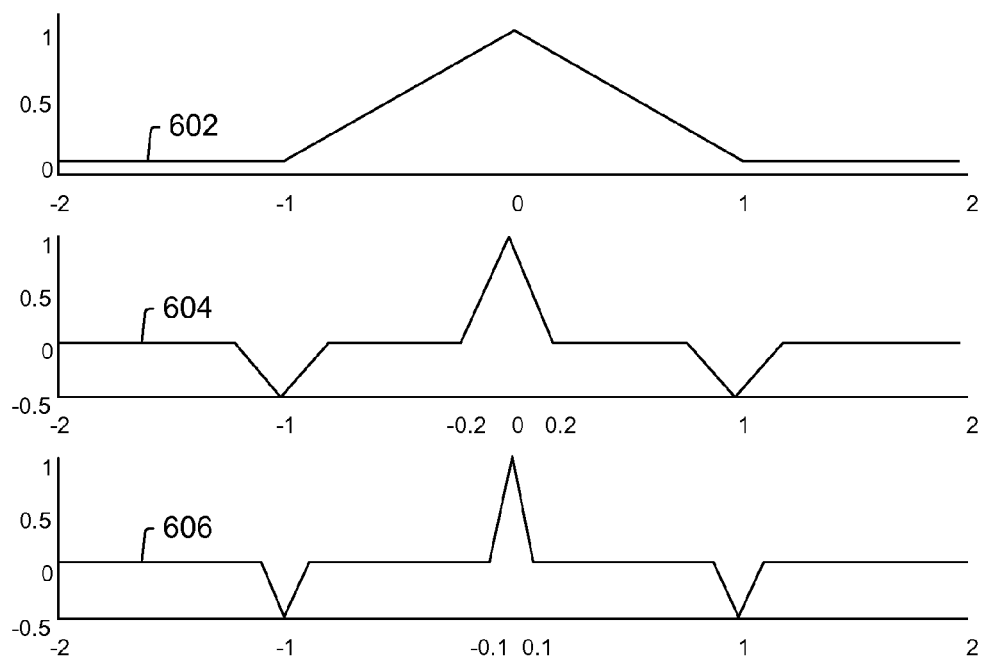
FIG. 6 is an illustrative set of graphed waveforms presenting certain aspects of some exemplary uniform and non-uniform autocorrelation functions corresponding to the exemplary waveforms of FIG. 5.

With at least these exemplary techniques in mind, reference is now made to FIG. 5, which is an illustrative set of graphed waveforms presenting certain aspects of some exemplary uniform and non-uniform waveforms that may be used in a correlation process, and to FIG. 6, which shows some exemplary corresponding uniform and non-uniform ACF waveforms. Here, as with FIG. 5, the x-axis shows chips and the y-axis shows amplitude.

Waveform 502 and corresponding ACF 602 represent portion of "uniform" waveforms, for example, which may be associated with a phase shifted replica waveform or the like. In certain example implementations, ACF 602 may be adapted for use in a selectable correlation mode 228 (e.g., a Uniform c×20 mode (L1_20)) that may be effective when a wireless signal may be (or may be expected to be) weaker in signal strength than a non-uniform mode sensitivity threshold.

Waveform 506 represents a portion of a "non-uniform" waveform, for example, which may be associated with two or more combined phase shifted replica waveforms or the like. Corresponding ACF waveform 606 may be adapted for use in a selectable correlation mode 228 (e.g., a non-uniform 4-sample correlation (on 20 samples per chip) mode (L1_NU4_20)). Such a non-uniform correlation mode may be more effective than other modes at times due, at least in part, to its narrow operative width. For example, in certain example, implementations, such a L1_NU4_20 correlation mode may have an operative width of 0.1 chips and with c×20 hypothesis resolution, which is one-tenth of the ACF width by full (Uniform) correlation and with ten times resolution, may therefore provide the capability of resolving multipath components that may be separated by more than 0.15 chips (e.g., 1.5*¹/₁₀). However, it may be expected that such L1_NU4_20 mode and/or other like non-uniform modes may introduce a loss in sensitivity (e.g., due to partially enabling local code waveform for correlation, which may reduce the effective coherent integration time).

Waveform 504 represents a portion of another "non-uniform" waveform, for example, which may be associated with two or more combined phase shifted replica waveforms or the like. Corresponding ACF waveform 604 may be adapted for use in a selectable correlation mode 228 (e.g., a non-uniform 8-sample correlation mode (L1_NU8_20)). Here, for example, when compared to ACF waveform 606, the operative width of ACF waveform 604 has been widened which may provide for less sensitivity loss. Such a L1_NU8_20 correlation mode may only provide for multipath immunity (e.g., 0.30 chips), however.

Table 1 below presents a summary of these exemplary selectable "wideband" correlation modes.

TABLE 1

| Correlation Mode | Sampling Rate | ACF width (one-sided, in chip) | Shortest Resolvable Multipath (chip) | Sensitivity Loss (dB) | Expected 12s Mode Sensitivity (dB-Hz) | Number of Samples on ACF |
|---|---|---|---|---|---|---|
| L1_20 | Cx20 | 1.0 | 1.50 | −0.78 | 10.9 | 39 |
| L1_NU8_20 | Cx20 | 0.2 | 0.30 | 6.36 | 18.1 | 5 |
| L1_NU4_20 | Cx20 | 0.1 | 0.15 | 9.56 | 21.3 | 3 |

An exemplary method will now be illustrated as showing that a plurality of correlation modes may be selectively initiated depending on various factors, such as, for example, signal strength and related thresholds. It should be understood that such a method may be implemented for two or more selectable correlation modes. In certain example implementations, some of the selectable correlation modes may include uniform modes while others may include non-uniform modes. In certain implementations, one or more of the waveforms and/or ACF associated with a selectable correlation mode may be pre-established and/or may be dynamically established in some manner. In certain implementations, one or more of the decision factors associated with such a method may be pre-established and/or may be dynamically established in some manner. As described in the examples below, measured signal strength (MSS) is one parameter that may be used for determining when to transition from one correlation mode to another correlation mode.

Figure 4:
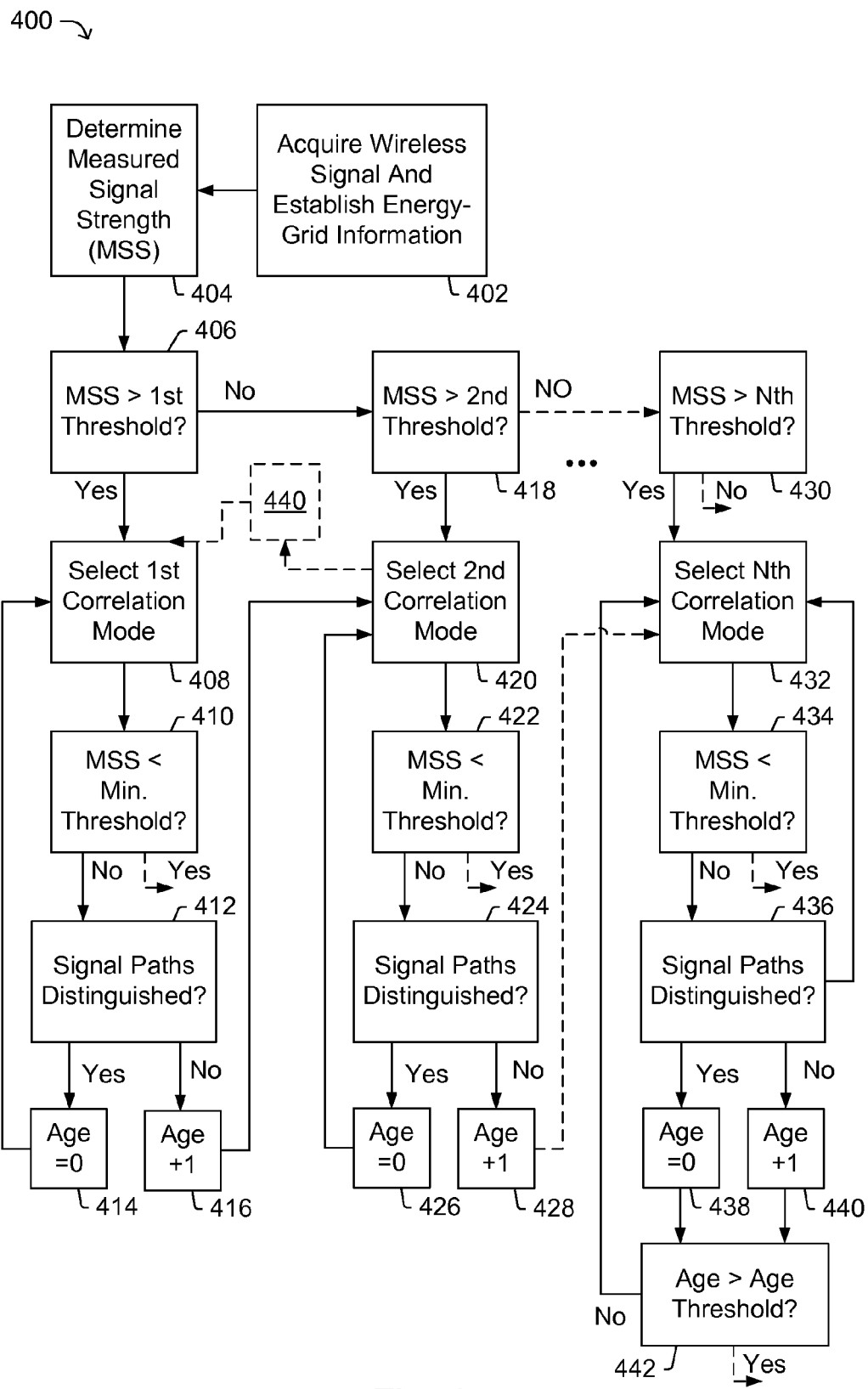
FIG. 4 is a flow diagram illustrating an exemplary method operatively enabled to perform mode switching, initiation, and/or other like selection processing that may, for example, be implemented in the environment of FIG. 1 and/or the device of FIG. 2.

FIG. 4 presents a flow diagram illustrating an exemplary method 400 that may be operatively enabled to perform mode switching, initiation, and/or other like selection processing. In certain implementations, certain portions of method 400 may be associated with mode switching process 238 (FIG. 2). In certain implementations, correlation modes such as examples L1_20, L1_NU4_20, L1_NU8_20, and/or the like, may be selectively initiated.

At block 402, at least one wireless signal may be acquired and at least a portion of the signal related data (e.g., energy-grid data or the like) associated therewith may be established. At block 404, MSS may be determined for the acquired signal. At block 406 it may be determined if the MSS exceeds a first threshold value. If the MSS exceeds the first threshold value then method 400 may proceed to initiate a first correlation mode (e.g., L1_NU4_20). If the MSS does not exceed the first threshold value then method 400 may proceed to block 418.

At block 418 it may be determined if the MSS exceeds a second threshold value. If the MSS exceeds the second threshold value then method 400 may proceed to initiate a second correlation mode (e.g., L1_NU8_20). If the MSS does not exceed the second threshold value then method 400 may proceed to block 430.

At block 430 it may be determined if the MSS exceeds an $N^{th}$ threshold value. If the MSS exceeds the $N^{th}$ threshold value then method 400 may proceed to initiate an $N^{th}$ correlation mode (e.g., L1_20). If the MSS does not exceed the $N^{th}$ threshold value then method 400 may end.

Returning attention to block 406, if the MSS exceeds the first threshold value then at block 408 a first correlation mode may be selected and operatively initiated. Subsequently, while operating with the first correlation mode, at block 410 it may be determined that the MSS falls below a minimum threshold, at which point method 400 may end. Here, for example, if the MSS is less than the minimum threshold other processes may be initiated to possibly select another acquired wireless signal and/or initiate acquisition of another wireless signal, which may subsequently become the subject of additional processing through later application of method 400.

At block 410, if it is determined that the MSS does not fall below the minimum threshold then operation with the first correlation mode may continue until, at block 412, a decision may be made as to whether certain signal components (e.g., multipath) have been made distinguishable, at least in part, through the operation with the first correlation mode. If it is determined that the first correlation mode is allowing for such signal path distinction/resolution, then at block 414 an "age" parameter or the like may be reset (here, e.g., set to equal 0). While the age parameter is below an age threshold method 400 may flow from block 414 back to block 408 to maintain operation with the first correlation mode. To the contrary, if it is determined that the first correlation mode is not allowing for such signal path distinction/resolution, then at block 406 such "age" parameter or the like may be incremented or otherwise modified (here, e.g., the age may be increased by 1) and method 400 may act to switch correlation modes. For example, method 400 may flow from block 416 to block 420.

At block 420 a second correlation mode may be selected and operatively initiated. The decision to select between different correlation modes (for example, based at least in part on MSS and/or the like), may be operatively enabled to take into account certain tradeoffs between multipath resolution and sensitivity. For example, one correlation mode may work better in resolving multipath by employing a narrower ACF, while another correlation mode may provide better sensitivity by integrating more samples per chip.

Subsequently, while operating with the second correlation mode, at block 422 it may be determined that the MSS falls below the minimum threshold, at which point method 400 may end (e.g., a diversity or other like process may be initiated). At block 422, if it is determined that the MSS does not fall below the minimum threshold then operation with the second correlation mode may continue until, at block 424, a decision may be made as to whether certain signal components (e.g., multipath) have been made distinguishable, at least in part, through the operation with the second correlation mode. If it is determined that the second correlation mode is allowing for such signal path distinction/resolution, then at block 426 the "age" parameter or the like may be reset. While the age parameter is below an age threshold method 400 may flow from block 426 back to block 420 to maintain operation with the second correlation mode. If instead it is determined that the second correlation mode is not allowing for such signal path distinction/resolution, then at block 428 such "age" parameter or the like may be incremented and method 400 may act again to switch correlation modes. For example, method 400 may flow from block 428 to block 432.

At block 432 an $N^{th}$ correlation mode may be selected and operatively initiated. Subsequently, while operating with the $N^{th}$ correlation mode, at block 434 it may be determined that the MSS falls below the minimum threshold, at which point method 400 may end (e.g., a diversity or other like process may be initiated). At block 434, if it is determined that the MSS does not fall below the minimum threshold then operation with the $N^{th}$ correlation mode may continue until, at block 436, a decision may be made as to whether certain signal components (e.g., multipath) have been made distinguishable, at least in part, through the operation with the $N^{th}$ correlation mode. If it is determined that the $N^{th}$ correlation mode is allowing for such signal path distinction/resolution, then at block 438 the "age" parameter or the like may be reset. While the age parameter is below an age threshold method 400 may flow from block 438 back to block 432 to maintain operation with the $N^{th}$ correlation mode. If, however, it is determined that the $N^{th}$ correlation mode is not allowing for such signal path distinction/resolution, then at block 440 such "age" parameter or the like may be incremented. At block 442, if the age parameter exceeds the age threshold, then method 400 may end (e.g., a diversity or other like process may be initiated). At block 442, if the age parameter does not exceed the age threshold, then method 400 may flow back to block 432 and operation with the $N^{th}$ correlation mode may be continued.

As illustrated in this example implementation, method 400 may be operatively enabled to selectively switch from higher to lower resolution correlation modes based on certain factors (e.g., success, MSS, age, time, etc.). In other implementations, additional blocks, represented here by block 440, may be operatively enabled to allow method 400 to be operatively enabled to selectively switch from lower to higher resolution correlation modes based on certain factors, such as, success (e.g., number of distinguished path(s)), MSS, etc. In the illustrated example, block 440 may allow method 400 to flow from block 420 to block 408.

In certain exemplary implementations, the functions described herein may be implemented in hardware, software, firmware, or any combination thereof. If implemented in software, the functions may be stored on or transmitted over as one or more instructions or code on a computer-readable medium 240. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

For example, one skilled in the art should now recognize that, in certain example implementations tracking processes/operations with the combined non-uniform result may not be necessary, as one may provide other functionality (e.g., a regular channel) that performs tracking in parallel. Thus, a non-uniform result may be implemented to provide a potentially multipath free measurement to "correct" the regular channel. Here, for example, such techniques may reduce energy usage.

Therefore, it is intended that claimed subject matter not be limited to the particular examples disclosed, but that such claimed subject matter may also include all aspects falling within the scope of appended claims, and equivalents thereof.

What is claimed is:

1. A method comprising:
   accessing at least a portion of data associated with an acquired wireless signal, wherein said wireless signal comprises a first signal path component and a second signal path component; and
   selectively determining code phase measurement data associated with said data by, at least:
      selectively initiating at least one of a plurality of selectable correlation modes based, at least in part, on a measured signal strength associated with said data, and
      distinguishing said first signal path component from at least a portion of said second signal path component as represented within said data based, at least in part, on a non-uniform autocorrelation function associated said one of said plurality of selectable correlation modes.

2. The method as recited in claim 1, wherein selectively initiating said at least one of said plurality of selectable correlation modes comprises:
   selectively initiating a first one of said plurality of selectable correlation modes in response to said measured signal strength exceeding a first signal strength threshold.

3. The method as recited in claim 2, wherein selectively initiating said at least one of said plurality of selectable correlation modes comprises:
   selectively initiating a second one of said plurality of selectable correlation modes in response to said measured signal strength not exceeding said first signal strength threshold but exceeding a second signal strength threshold.

4. The method as recited in claim 3, wherein said first one of said plurality of selectable correlation modes is associated with a first non-uniform autocorrelation function having a first operative width, said second one of said plurality of selectable correlation modes is associated with a second non-uniform autocorrelation function having a second operative width, and wherein said first operative width is narrower than said second operative width.

5. The method as recited in claim 1, wherein selectively initiating said at least one of said plurality of selectable correlation modes comprises selectively initiating said at least one of said plurality of selectable correlation modes based, at least in part, on at least one factor.

6. The method as recited in claim 1, wherein said second signal path component comprises a short multipath signal component.

7. The method as recited in claim 1, further comprising:
   acquiring said wireless signal; and
   establishing at least said portion of said data associated with said acquired wireless signal.

8. The method as recited in claim 1, further comprising establishing said measured signal strength.

9. The method as recited in claim 1, wherein said wireless signal comprises a Satellite Positioning System (SPS) signal.

10. An apparatus comprising:
    memory operatively enabled to store at least a portion of data associated with an acquired wireless signal, wherein said wireless signal comprises a first signal path component and a second signal path component; and
    at least one processing unit coupled to said memory and operatively enabled to:
    access at least said portion of data;
    selectively initiate at least one of a plurality of selectable correlation modes based, at least in part, on a measured signal strength associated with said data;
    distinguish said first signal path component from at least a portion of said second signal path component as represented within said data based, at least in part, on a non-uniform autocorrelation function associated said one of said plurality of selectable correlation modes; and
    establish code phase measurement data associated with said data.

11. The apparatus as recited in claim 10, wherein said at least one processing unit is further operatively enabled to selectively initiate a first one of said plurality of selectable correlation modes in response to said measured signal strength exceeding a first signal strength threshold.

12. The apparatus as recited in claim 11, wherein said at least one processing unit is further operatively enabled to selectively initiate a second one of said plurality of selectable correlation modes in response to said measured signal strength not exceeding said first signal strength threshold but exceeding a second signal strength threshold.

13. The apparatus as recited in claim 12, wherein said first one of said plurality of selectable correlation modes is associated with a first non-uniform autocorrelation function having a first operative width, said second one of said plurality of selectable correlation modes is associated with a second non-uniform autocorrelation function having a second operative width, and wherein said first operative width is narrower than said second operative width.

14. The apparatus as recited in claim 10, wherein said at least one processing unit is further operatively enabled to:
    selectively initiate said at least one of said plurality of selectable correlation modes based, at least in part, on at least one factor.

15. The apparatus as recited in claim 10, wherein said second signal path component comprises a short multipath signal component.

16. The apparatus as recited in claim 10, further comprising a circuit coupled to at least one of said memory and/or said at least one processing unit, and operatively enabled to acquire said wireless signal and establish at least said portion of said data associated with said acquired wireless signal.

17. The apparatus as recited in claim 10, wherein said at least one processing unit is further operatively enabled to establish said measured signal strength.

18. The apparatus as recited in claim 10, wherein said wireless signal comprises a Satellite Positioning System (SPS) signal.

19. An apparatus comprising:
    means of providing at least a portion of data associated with an acquired wireless signal, wherein said wireless signal comprises a first signal path component and a second signal path component;
    means for selectively initiating at least one of a plurality of selectable correlation modes based, at least in part, on a measured signal strength associated with said data;
    means for distinguishing said first signal path component from at least a portion of said second signal path component as represented within said data based, at least in part, on a non-uniform autocorrelation function associated said one of said plurality of selectable correlation modes; and means for establishing code phase measurement data associated with said data.

20. The apparatus as recited in claim 19, further comprising:

means for selectively initiating a first one of said plurality of selectable correlation modes in response to said measured signal strength exceeding a first signal strength threshold.

21. The apparatus as recited in claim 20, further comprising:

means for selectively initiating a second one of said plurality of selectable correlation modes in response to said measured signal strength not exceeding said first signal strength threshold but exceeding a second signal strength threshold.

22. The apparatus as recited in claim 21, wherein said first one of said plurality of selectable correlation modes is associated with a first non-uniform autocorrelation function having a first operative width, said second one of said plurality of selectable correlation modes is associated with a second non-uniform autocorrelation function having a second operative width, and wherein said first operative width is narrower than said second operative width.

23. The apparatus as recited in claim 19, further comprising:

means for selectively initiating said at least one of said plurality of selectable correlation modes based, at least in part, on at least one factor.

24. The apparatus as recited in claim 19, wherein said second signal path component comprises a short multipath signal component.

25. The apparatus as recited in claim 19, further comprising:

means for acquiring said wireless signal; and
means for establishing at least said portion of said data associated with said acquired wireless signal.

26. The apparatus as recited in claim 19, further comprising means for establishing said measured signal strength.

27. The apparatus as recited in claim 19, wherein said wireless signal comprises a Satellite Positioning System (SPS) signal.

28. An article comprising a computer readable medium having stored thereon computer implementable instructions which if implemented by one or more processing units operatively enables the one or more processing units to:

access at least a portion of data associated with an acquired wireless signal, wherein said wireless signal comprises a first signal path component and a second signal path component;

selectively initiate at least one of a plurality of selectable correlation modes based, at least in part, on a measured signal strength associated with said data;

distinguish said first signal path component from at least a portion of said second signal path component as represented within said data based, at least in part, on a non-uniform autocorrelation function associated said one of said plurality of selectable correlation modes; and establish code phase measurement data associated with said data.

29. The article as recited in claim 28, wherein said computer implementable instructions, if implemented by the one or more processing units, operatively enables the one or more processing units to selectively initiate a first one of said plurality of selectable correlation modes in response to said measured signal strength exceeding a first signal strength threshold.

30. The article as recited in claim 29, wherein said computer implementable instructions, if implemented by the one or more processing units, operatively enable the one or more processing units to selectively initiate a second one of said plurality of selectable correlation modes in response to said measured signal strength not exceeding said first signal strength threshold but exceeding a second signal strength threshold.

31. The article as recited in claim 30, wherein said first one of said plurality of selectable correlation modes is associated with a first non-uniform autocorrelation function having a first operative width, said second one of said plurality of selectable correlation modes is associated with a second non-uniform autocorrelation function having a second operative width, and wherein said first operative width is narrower than said second operative width.

32. The article as recited in claim 28, wherein said computer implementable instructions, if implemented by the one or more processing units, operatively enables the one or more processing units to selectively initiate said at least one of said plurality of selectable correlation modes based, at least in part, on at least one factor.

33. The article as recited in claim 28, wherein said second signal path component comprises a short multipath signal component.

34. The article as recited in claim 28, wherein said computer implementable instructions, if implemented by the one or more processing units, operatively enable the one or more processing units to establish at least said portion of said data associated with said wireless signal.

35. The article as recited in claim 28, wherein said computer implementable instructions, if implemented by the one or more processing units, operatively enable the one or more processing units to establish said measured signal strength.

36. The article as recited in claim 28, wherein said wireless signal comprises a Satellite Positioning System (SPS) signal.

* * * * *